US011879113B2

(12) United States Patent
Henn et al.

(10) Patent No.: US 11,879,113 B2
(45) **Date of Patent: *Jan. 23, 2024**

(54) TWO SOLUTION STAIN REMOVAL SYSTEMS AND METHODS COMPRISING AN ALCOHOL-BASED SOLUTION AND A PEROXIDE-BASED SOLUTION

(71) Applicant: WOW Products LLC, St. Paul, MN (US)

(72) Inventors: Dale Henn, Minneapolis, MN (US); Gregory Olean, Columbia Heights, MN (US); Patrick Schneider, Inver Grove Heights, MN (US)

(73) Assignee: WOW PRODUCTS LLC, St. Paul, MN (US)

( * ) Notice: Subject to any disclaimer, the term of this patent is extended or adjusted under 35 U.S.C. 154(b) by 465 days.

This patent is subject to a terminal disclaimer.

(21) Appl. No.: 17/001,381

(22) Filed: Aug. 24, 2020

(65) Prior Publication Data

US 2020/0385654 A1 Dec. 10, 2020

Related U.S. Application Data

(63) Continuation of application No. 16/288,607, filed on Feb. 28, 2019, now Pat. No. 10,752,866.

(60) Provisional application No. 62/636,359, filed on Feb. 28, 2018.

(51) Int. Cl.

| | |
|---|---|
| ***C11D 7/50*** | (2006.01) |
| ***C11D 7/06*** | (2006.01) |
| ***C11D 11/00*** | (2006.01) |
| ***C11D 7/26*** | (2006.01) |
| ***C11D 7/08*** | (2006.01) |

(52) U.S. Cl.
CPC .................. *C11D 7/06* (2013.01); *C11D 7/08* (2013.01); *C11D 7/261* (2013.01); *C11D 11/0064* (2013.01)

(58) Field of Classification Search
CPC ..... C11D 3/201; C11D 3/0052; C11D 3/3951; C11D 3/43; C11D 3/48; C11D 7/5077
See application file for complete search history.

(56) References Cited

U.S. PATENT DOCUMENTS

| | | | | |
|---|---|---|---|---|
| 3,607,760 A * | 9/1971 | McIntyre | C11D 3/0031 | 510/303 |
| 5,259,848 A * | 11/1993 | Terry | C11D 3/3947 | 510/357 |
| 5,522,580 A * | 6/1996 | Varner, Jr. | C11D 7/5022 | 510/281 |
| 6,028,044 A * | 2/2000 | Harris | C11D 11/0017 | 510/278 |
| 6,043,209 A * | 3/2000 | Micciche | C11D 3/2068 | 510/303 |
| 6,046,150 A * | 4/2000 | Choy | C07D 295/15 | 510/303 |
| 2005/0109981 A1* | 5/2005 | Tucker | A62D 3/38 | 252/186.38 |
| 2008/0041424 A1* | 2/2008 | Wick | C11D 17/041 | 134/119 |
| 2020/0035494 A1* | 1/2020 | Wojtczak | H01L 21/02118 | |

* cited by examiner

*Primary Examiner* — Charles I Boyer
(74) *Attorney, Agent, or Firm* — Winthrop & Weinstine, P.A.; Nadeem W. Schwen; Alicia Griffin Mills

(57) ABSTRACT

Systems and methods are provided for removing a stain from a surface. A first solution is applied to the stain, wherein the first solution comprises a combination of an ammoniated substance such as ammonium hydroxide and an alcohol such as isopropanol. A second solution is then applied to the stain treated with the first solution, wherein the second solution comprises between approximately 6% and approximately 15% hydrogen peroxide.

19 Claims, 3 Drawing Sheets

TWO SOLUTION STAIN REMOVAL SYSTEMS AND METHODS COMPRISING AN ALCOHOL-BASED SOLUTION AND A PEROXIDE-BASED SOLUTION

CROSS-REFERENCE TO RELATED APPLICATIONS

The present disclosure is a Continuation of U.S. application Ser. No. 16/288,607, filed on Feb. 28, 2019, which claims priority to U.S. Provisional Application No. 62/636,359, entitled "Stain Removal Systems and Methods," and filed Feb. 28, 2018, the content of which is hereby incorporated by reference herein in its entirety.

FIELD OF THE INVENTION

The present disclosure relates to systems and methods for removing stains. Particularly, the present disclosure relates to systems and methods for removing organic stains. More particularly, the present disclosure relates to two-step systems and methods for removing organic stains from surfaces without excessive rubbing, scrubbing, or scraping.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Many food and drink products, bodily fluids, and other components can leave behind stains on carpets, rugs, or other surfaces. Efforts to remove these stains can involve vigorous rubbing, scrubbing, scraping, or other relatively active or vigorous cleaning. Many commercially available cleaning products are available to help remove or mitigate stains. However, these products often still require a user to rub, scrub, or scrape the stained area before or after the products are applied. Moreover, many available cleaning products leave behind a film or residue on carpet fibers or other stain surfaces. The left behind residue may be undesirable, and in some cases, may attract dirt or bacteria to the surface.

Additionally, some stains are not treatable with most commercially available products, and are instead thought to require professional stain removal services. Such stains may include, for example, ketchup, mustard, coffee, wine, pet urine, vomit, soda, and many others. However, professional cleaning services often use expensive or corrosive chemicals that can be harmful to carpets or other stained surfaces. Moreover, many professional stain removal services leave behind soapy or sticky residues on carpet fibers or other stain surfaces, such can attract dirt or bacteria to the surface.

Thus, there is a need in the art for systems and methods for removing stains from surfaces without the need for excessive rubbing, scrubbing, or scraping. Moreover, there is a need in the art for systems and methods for removing stains from surfaces without leaving behind residue.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

The present disclosure relates to novel and advantageous stain removal systems and methods. Particularly, the present disclosure relates to a two-step stain removal system, wherein first and second solutions are applied consecutively or simultaneously to a stained surface. Upon combining, the first and second solutions may produce an exothermic reaction, which may help to dissolve the stain. In some embodiments, the exothermic reaction may continue for several minutes or hours. The exothermic reaction may operate to break down and dissolve the stain with little or no scrubbing, rubbing, scraping, or other vigorous cleaning. In at least one embodiment, the exothermic reaction may operate to break down and dissolve the stain with no scrubbing, rubbing, or scrubbing needed. In this way, stain removal systems of the present disclosure may generally provide for a relatively hands-free cleaning system. Moreover, the two solutions may be volatile, such that the solutions may evaporate after breaking down a stain. In this way, the stain removal system may dissolve the stain without leaving behind a soapy or sticky residue.

In some embodiments, stain removal systems of the present disclosure may be particularly suited to dissolve organic stains. For example, stain removal systems of the present disclosure may be used to dissolve such materials as drinks, such as coffee, tea, soda pop, fruit juice, sports drinks, beer, and wine; food products, such as ketchup, mustard, syrup, and chocolate; and bodily fluids, such as blood, urine, feces, and vomit. Stain removal systems of the present disclosure may be used to dissolve other organic stains as well. In general, the exothermic reaction produced by the stain removal system may operate to break down chemical bonds of organic stains.

Stain removal systems of the present disclosure may be used to remove or mitigate stains on a variety of surfaces. For example, stain removal systems of the present disclosure may operate to remove stains on natural and synthetic carpet fibers, including fibers having natural or synthetic dyes. The systems may be used on Persian rugs having natural dyes, for example. In some embodiments, stain removal systems of the present disclosure may be used to remove or mitigate stains on clothing, curtains, or other cloth or fabric surfaces. Additionally, in some embodiments, stain removal systems of the present disclosure may be used to remove or mitigate stains on other surfaces, such as tile, grout, or other hard surfaces. Moreover, in some embodiments, a stain removal system of the present disclosure may be used to help clear or clean a drain pipe, such as a sink, shower, bathtub, or other drain, by dissolving materials blocking or odorizing the drain. In still other embodiments, stain removal systems of the present disclosure may have other applications as well.

Figure 1:
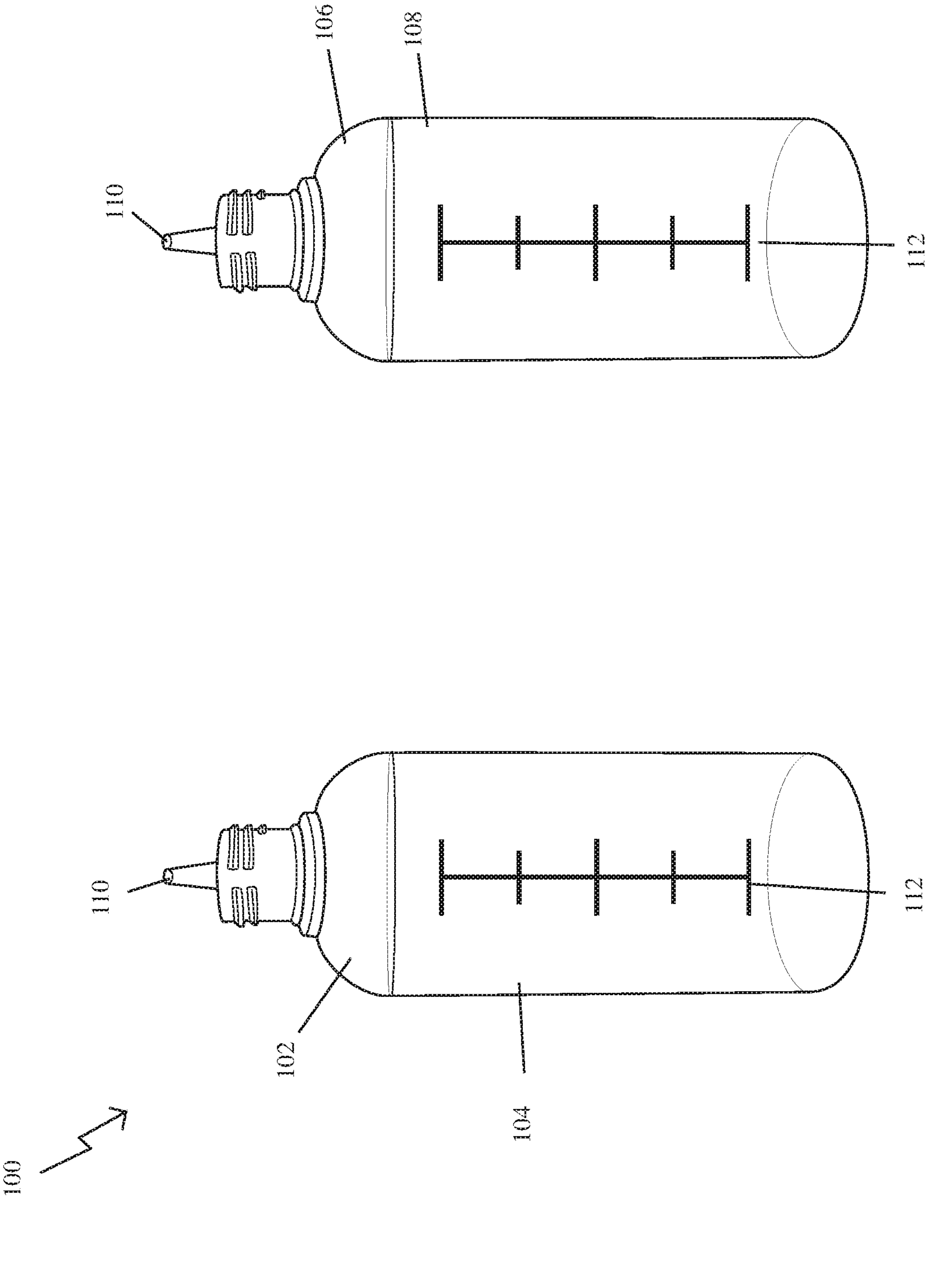
FIG. 1 is a side view of a stain removal system of the present disclosure, according to one or more embodiments.

Turning now to FIG. 1, a stain removal system 100 of the present disclosure is shown, according to one or more embodiments. The stain removal system 100 may include two containers. A first container 102 may hold a first solution 104, and a second container 106 may hold a second solution 108. The two-container system 100 may allow a user to combine the solutions of the two containers during, or prior to, application to a stain. In this way, the active ingredients may be maintained separately until, or just prior to, application to a stain. Once combined, the active ingredients may produce an exothermic reaction, which may help to dissolve a stain.

In some embodiments, the first solution 104 may have a quantity of ammonium hydroxide, or another suitable ammoniated substance. For example, the first solution 104 may have a quantity of ammonium hydroxide ranging from approximately 3% to approximately 9% by weight of the solution. In some particular embodiments, the first solution 104 may have approximately 3%, 3.5%, 4%, 4.5%, 5%, 5.5%, 6%, 6.5%, 7%, 7.5%, 8%, 8.5%, 9%, or any other percentage of ammonium hydroxide within the range of approximately 3% and approximately 9%. In other embodiments, the first solution 104 may have any other suitable quantity of ammonium hydroxide.

In some embodiments, the first solution 104 may additionally contain a quantity of isopropanol, or another suitable wetting agent. Other suitable wetting agents may include, but are not limited to, water soluble alcohols containing up to 5 carbon atoms, such as methyl alcohol, ethyl alcohol, N-propyl alcohol, sec-butyl alcohol, and tert-butyl alcohol. In other embodiments, a glycol, such as but not limited to glycerol, ethylene glycol, propylene glycol, and trimethylene glycol, may be used as a wetting agent., as described above. In some embodiments, the first solution 104 may have a quantity of isopropanol ranging from approximately 70% to approximately 98%. In some particular embodiments, the first solution may have approximately 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or any other percentage of isopropanol within the range of approximately 70% and approximately 98%. In some embodiments, the first solution 104 may have additional and/or alternative components. However, it may be appreciated that the ammonium hydroxide and isopropanol may be combined in the above-described quantities without the use of a stabilizing agent, in some embodiments.

The second container 106 may hold a second solution 108. In some embodiments, the second solution 108 may contain a quantity of peroxide, such as hydrogen peroxide or any other suitable peroxide. For example, the second solution 108 may have a quantity of hydrogen peroxide ranging from approximately 1% to approximately 50%. Particularly, the second solution 108 may have a quantity of hydrogen peroxide ranging from approximately 2% to approximately 40%, from approximately 3% to approximately 30%, from approximately 5% to approximately 20%, or from approximately 6% to approximately 15% hydrogen peroxide. Particularly, the second solution 108 may have from approximately 10% to approximately 14%, or from 11% to approximately 13% hydrogen peroxide. In some particular embodiments, the second solution 108 may have approximately 12% hydrogen peroxide. The second solution 108 may additionally have a diluent, such as but not limited to water, to act as a diluent with the peroxide. In some embodiments, the second solution 108 may comprise, for example 40 volume hydrogen peroxide. In some embodiments, the second solution 108 may have additional and/or alternative components.

In some embodiments, the first and second containers 102, 106 may be constructed of plastic, glass, metal, or other components. For example, in some embodiments, the first and second contains may be constructed of a low-density polyethylene, or other squeezable or flexible material, such that a user may squeeze the containers to release the components. In some embodiments, each container may have an opening 110 covered by a cap or lid. In some embodiments, the first and second containers may have, or be configured to operate with, spray nozzles. In some embodiments, each of the first and second containers may have volume or quantity markings 112. Volume markings may help a user to gauge how much of each component has been used.

Figure 2:
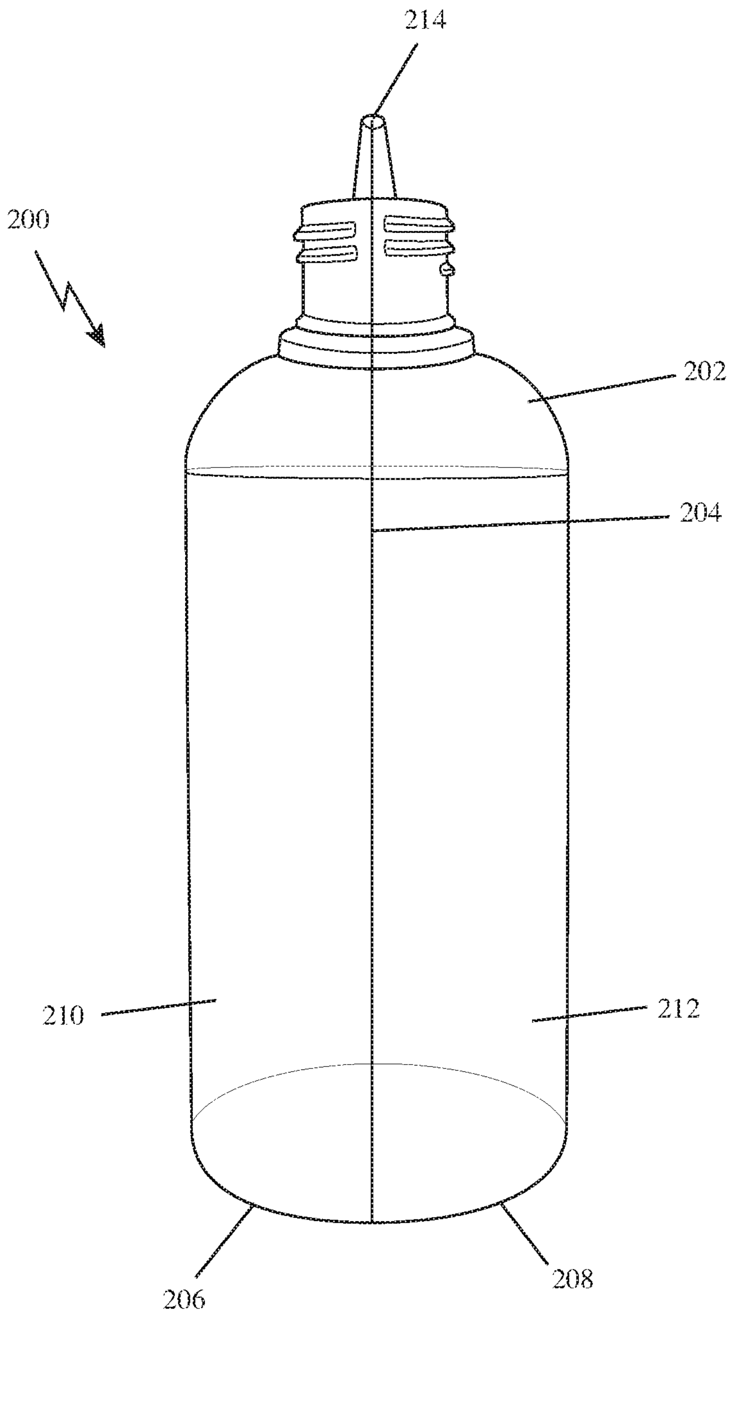
FIG. 2 is a side view of another stain removal system of the present disclosure, according to one or more embodiments.

In some embodiments, the first and second containers may be provided as compartments of a single container, as shown for example in the stain removing system 200 of FIG. 2. The single container 202 may have a partition 204 configured to divide two compartments 206, 208, and maintain separation between the two solutions 210, 212. In some embodiments, the container may have an opening 214 that allows the two solutions to be dispensed simultaneously. In other embodiments, each compartment may have a separate opening, such that two solutions may be dispensed independently.

In still other embodiments, the first and second solutions may be combined into a single container. That is, the ammonium hydroxide, isopropanol, and hydrogen peroxide may be combined into a single solution in a single container. In some embodiments, a stabilizing agent may be used to help stabilize the combined solution.

In general, the solution(s) may be configured to be applied to a stain, such as a rug or carpet stain. In some embodiments, the first and second solutions may be applied in equal proportions. In other embodiments, the first and second solutions may be applied in different proportions. The first and second solutions may generally be applied simultaneously or consecutively. In some embodiments, the first and second solutions may be applied individual to the stain, and may combine to produce a reaction at the site of the stain. In other embodiments, the first and second solutions may be mixed prior, such as just moments prior, to being applied to the stain.

Figure 3:
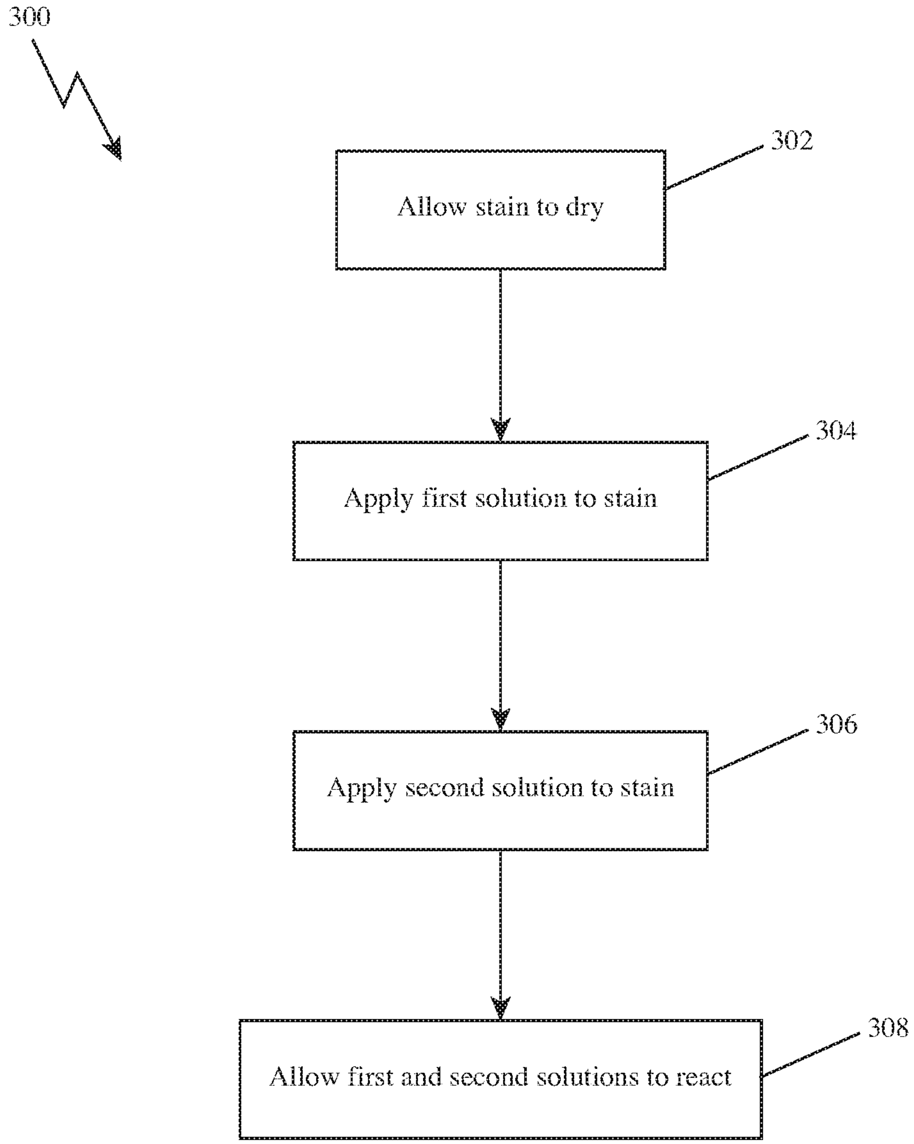
FIG. 3 is a flow diagram of a method of the present disclosure, according to one or more embodiments.

Turning now to FIG. 3, a method 300 of using a stain removal system of the present disclosure is shown, according to one or more embodiments. The method 300 may include the steps of allowing the stain to dry 302, applying the first solution to the stain 304, applying the second solution to the stain 306, and allowing the first and second solutions to react, undisturbed 308.

As indicated above, the method 300 may include allowing a stain to dry 302. Particularly, after an organic component, such as a food product, drink product, or bodily fluid is spilled or otherwise paced on a carpet or other surface, the organic component may be left for a number of minutes, hours, or days to dry or partially dry. For example, in some embodiments, the stain may be permitted to dry for up to, or more than 7 days. In some embodiments, in addition to or alternative to allowing the stain to dry, excess stain material may be blotted away from the carpet or other stain surface. For example, excess stain material may be blotted before the stain is permitted to dry. It may be appreciated that allowing the stain to dry or partially dry, and/or blotting or otherwise removing excess stain material, may generally mitigate dilution of the first and second solutions upon application to the stain surface. That is, where the organic component, such as a drink product or bodily fluid, is in liquid form on the stain surface, it may generally dilute the first and second solutions upon application to the stain surface. However, it is to be appreciated that in other embodiments, the first and second solutions may be applied without allowing the stain to dry and/or without blotting or otherwise removing excess stain material from the stain surface.

The method 300 may additionally include applying a first solution to the stain 304. As described above, the first solution may include ammonium hydroxide and isopropanol in some embodiments. The first solution may be applied to the stain until the stain is saturated. In this way, the quantity of the first solution applied to the stain may depend on the size or extent of the stain, and/or on the surface on which the stain is adhered.

The method 300 may include apply a second solution to the stain 306. As described above, the second solution may contain hydrogen peroxide in some embodiments. In some embodiments, the quantity of the second solution applied to the stain may be equivalent, or substantially equivalent, to the quantity of the first solution applied. That is, for example, where one ounce of the first solution is applied to the stained surface, one once of the second solution may also be applied to the stained surface. In other embodiments, the first and second solutions may be applied at different ratios to one another. Moreover, it is to be appreciated that the first and second solutions may be applied in any order, or may be applied simultaneously in some embodiments.

The method 300 may include allowing the first and second solutions to react, undisturbed 308. As described above, the first and second solutions may combine to produce an exothermic reaction. The solutions may continue reacting with one another for a period of time. In some embodiments, for example, the solutions may continue reacting to produce heat for up to, or more than, four hours. In other embodiments the solutions may continue reacting to produce heat for a different period of time. Heat from the reaction may help to break down chemical bonds of the stain, so as to effectively dissolve the stain. Additionally, heat may help to increase the speed with which the first and second solutions operate to remove the stain from the stain surface. As the stain is broken down, it may be evaporated with the first and second solutions, such that the stain may be effectively removed from the surface without the need for excessive scrubbing, rubbing, or scraping. In at least one embodiment, the stain may be effectively removed from the surface without any scrubbing, rubbing, or scraping. However, in other embodiments, some amount of scrubbing, rubbing, scraping, or blotting may be used to help remove the stain from the surface.

In some embodiments, the method may include repeating steps 304, 306, and 308. That is, a second application of the first and second solutions may be used to help dissolve or mitigate particularly stubborn stains, such as where a stain has stronger or more complex bonds, for example.

In some embodiments, the method may include applying the first and/or second solutions to a test area. For example, where the stain is located on a rug, a user may wish to apply the first and/or second solutions to a test area of the rug (an area which may or may not be stained) to ensure that the first and/or second solutions will not damage or discolor the rug.

As indicated above, the first and second solutions may be applied to the stain surface in any order, or they may be applied simultaneously in some embodiments. For example, the first and second solutions may be combined in a container, such as a container having a spray top, and may be permitted to mix prior to being applied simultaneously to the stain surface. When combined, the first and second solutions may begin producing an exothermic reaction, as described above. When combined, the first and second solutions may continue producing the reaction, and thus may have continued effectiveness for stain removal, for up to, or more than, four hours, for example. In other embodiments, the combined first and second solutions may continue to producing an exothermic reaction for effective stain removal for a different period of time. Additionally, the first and second solutions may continue to effective remove stains after the exothermic reaction has ceased.

Stain removal systems of the present disclosure may be used to remove or mitigate stains, such as organic stains, with limited user involvement. That is, the exothermic reaction of the two solutions may operate to remove or mitigate a stain without the need for a user to scrub, rub, or brush the stain. In addition to providing for relatively hands-free stain removal, this may help to protect carpet fibers or other stain surfaces. That is, vigorous rubbing and scrubbing, often used to remove carpet stains, may distress and/or untwist carpet fibers. Stain removal systems of the present disclosure may provide for stain removal or mitigation with relatively little stress on carpet fibers or other stain surfaces, by reducing or even eliminating the need to rub, scrub, scrape, or brush the stain.

Moreover, a stain removal system of the present disclosure may effectively remove or reduce old stains as well as recent stains, in some embodiments. That is, for example in some embodiments, a stain removal system of the present disclosure may be effectively used to treat or remove stains minutes, hours, days, weeks, or even months after they occur.

It may be appreciated that the solutions described herein may be volatile or relatively volatile at or near room temperature. In this way, the solutions may evaporate or substantially evaporate after reacting to dissolve a stain. In this way, the stain removal system may operate without leaving behind a residue, on the carpet fibers or other stain surface.

Various embodiments of the present disclosure may be described herein with reference to flowchart illustrations and/or block diagrams. Although a flowchart or block diagram may illustrate a method as comprising sequential steps or a process as having a particular order of operations, many of the steps or operations in the flowchart(s) or block diagram(s) illustrated herein can be performed in parallel or concurrently, and the flowchart(s) or block diagram(s) should be read in the context of the various embodiments of the present disclosure. In addition, the order of the method steps or process operations illustrated in a flowchart or block diagram may be rearranged for some embodiments. Similarly, a method or process illustrated in a flow chart or block diagram could have additional steps or operations not included therein or fewer steps or operations than those shown. Moreover, a method step may correspond to a method, a function, a procedure, a subroutine, a subprogram, etc.

As used herein, the terms “substantially” or “generally” refer to the complete or nearly complete extent or degree of an action, characteristic, property, state, structure, item, or result. For example, an object that is “substantially” or “generally” enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of “substantially” or “generally” is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

We claim:

1. A stain removal system, comprising:
- a container holding:
  - a first solution comprising:
    - between approximately 3% and approximately 9% ammonium hydroxide; and
    - between approximately 70% and approximately 98% isopropanol; and
  - a second solution comprising:
    - between approximately 6% and approximately 15% hydrogen peroxide;
- wherein the solutions are mixed to form a single solution.

2. The stain removal system of claim 1, further comprising a stabilizing agent.

3. The stain removal system of claim 1, wherein the container has a volume gauge arranged thereon.

4. The stain removal system of claim 1, further comprising a third container in which a portion of the first solution and a portion of the second solution are mixed to form the single solution.

5. The stain removal system of claim 4, wherein the first, second, and third containers comprise flexible plastic.

6. The stain removal system of claim 4, further comprising a stabilizing agent in the third container.

7. A stain removal composition, consisting essentially of:
- a first solution consisting essentially of 3-9% of an ammoniated substance and 70-98% of an alcohol; and
- a second solution consisting essentially of 6-15% of a peroxide;
- wherein the first solution and the second solution are combined to form a single solution.

8. The stain removal composition of claim 7, wherein the ammoniated substance is ammonium hydroxide.

9. The stain removal composition of claim 8, wherein the alcohol is isopropyl alcohol.

10. The stain removal composition of claim 9, wherein the peroxide is hydrogen peroxide.

11. The stain removal composition of claim 7, further comprising a stabilizing agent.

12. A method of removing a stain from a surface, the method comprising:
- providing a first solution, the first solution comprising:
- between approximately 3% and approximately 9% ammonium hydroxide; and
  - between approximately 70% and approximately 98% isopropanol; and
- providing a second solution, the second solution comprising:
  - between approximately 6% and approximately 15% hydrogen peroxide;
- mixing the first solution and the second solution to form a combined solution; and
- applying the combined solution to the stain.

13. The method of claim 12, further comprising allowing the stain to dry before applying the combined solution.

14. The method of claim 13, wherein allowing the stain to dry comprises allowing the stain to dry for at least 7 days.

15. The method of claim 12, wherein the method does not include any rubbing, scrubbing, or scraping after the first and second solutions are applied.

16. The method of claim 12, further comprising:
- applying a second application of the combined solution.

17. The method of claim 12, wherein the stain is an organic stain.

18. The method of claim 12, wherein the surface is a natural or synthetic carpet surface.

19. The method of claim 12, wherein the first solution and the second solution are mixed immediately prior to application of the combined solution.

* * * * *